(12) United States Patent
Selfridge et al.

(10) Patent No.: US 6,206,579 B1
(45) Date of Patent: Mar. 27, 2001

(54) ARRANGEMENT FOR INTEGRATING A RECTANGULAR FIBER OPTIC CONNECTOR INTO A CYLINDRICAL CONNECTOR

(75) Inventors: Ritch Allen Selfridge, Sidney; Robert Kenneth Chapman, West Winfield, both of NY (US)

(73) Assignee: Amphenol Corporation, Wallingford, CT (US)

( * ) Notice: Subject to any disclaimer, the term of this patent is extended or adjusted under 35 U.S.C. 154(b) by 0 days.

(21) Appl. No.: 09/181,863

(22) Filed: Oct. 29, 1998

(51) Int. Cl.$^7$ .......................................... G02B 6/38
(52) U.S. Cl. ................... 385/60; 385/68; 385/53; 385/78
(58) Field of Search .................... 385/59, 60, 62, 385/68, 70, 72, 78, 86, 84, 76, 53

(56) References Cited

U.S. PATENT DOCUMENTS

| | | |
|---|---|---|
| 4,140,367 | 2/1979 | Makuch et al. . |
| 4,142,776 | 3/1979 | Cherin et al. . |
| 4,174,882 | 11/1979 | McCartney . |
| 4,279,467 * | 7/1981 | Borsuk et al. ........................ 385/60 |
| 5,000,536 | 3/1991 | Anderson et al. . |
| 5,104,242 | 4/1992 | Ishikawa . |
| 5,231,685 * | 7/1993 | Hanzawa et al. ...................... 385/84 |
| 5,283,848 | 2/1994 | Abendschein et al. . |
| 5,337,386 * | 8/1994 | Noll et al. ............................... 385/60 |
| 5,619,604 | 4/1997 | Shiflett et al. . |
| 5,689,598 | 11/1997 | Dean, Jr. et al. . |
| 5,715,342 | 2/1998 | Nodfelt et al. . |
| 5,920,669 * | 7/1999 | Knecht et al. ......................... 385/76 |
| 5,940,559 * | 8/1999 | Noll .................................... 385/53 |

* cited by examiner

Primary Examiner—Frank G. Font
Assistant Examiner—Sang H. Nguyen
(74) Attorney, Agent, or Firm—Blank Rome Comisky & McCauley, LLP

(57) ABSTRACT

A fiber optic connector system is made up of a receptacle and a plug connector assembly in which a cylindrical MT fiber optic contact assembly of the type including a pair of contact halves arranged to capture the MT connector and form a cylindrical contact, is inserted from the rear into a connector body and held in place with a retention insert and retention clip that engages an undercut in the retention insert. The connector body of one of the plug and receptacle connectors is arranged to provide a passage for aligning mating MT connectors extending from the respective contacts of a mating pair of connectors, while environmental sealing is provided by sealing members such as o-rings extending between the insert and the connector body, with coupling of mating connectors being provided by a coupling nut that may optionally may include anti-vibration features.

25 Claims, 5 Drawing Sheets

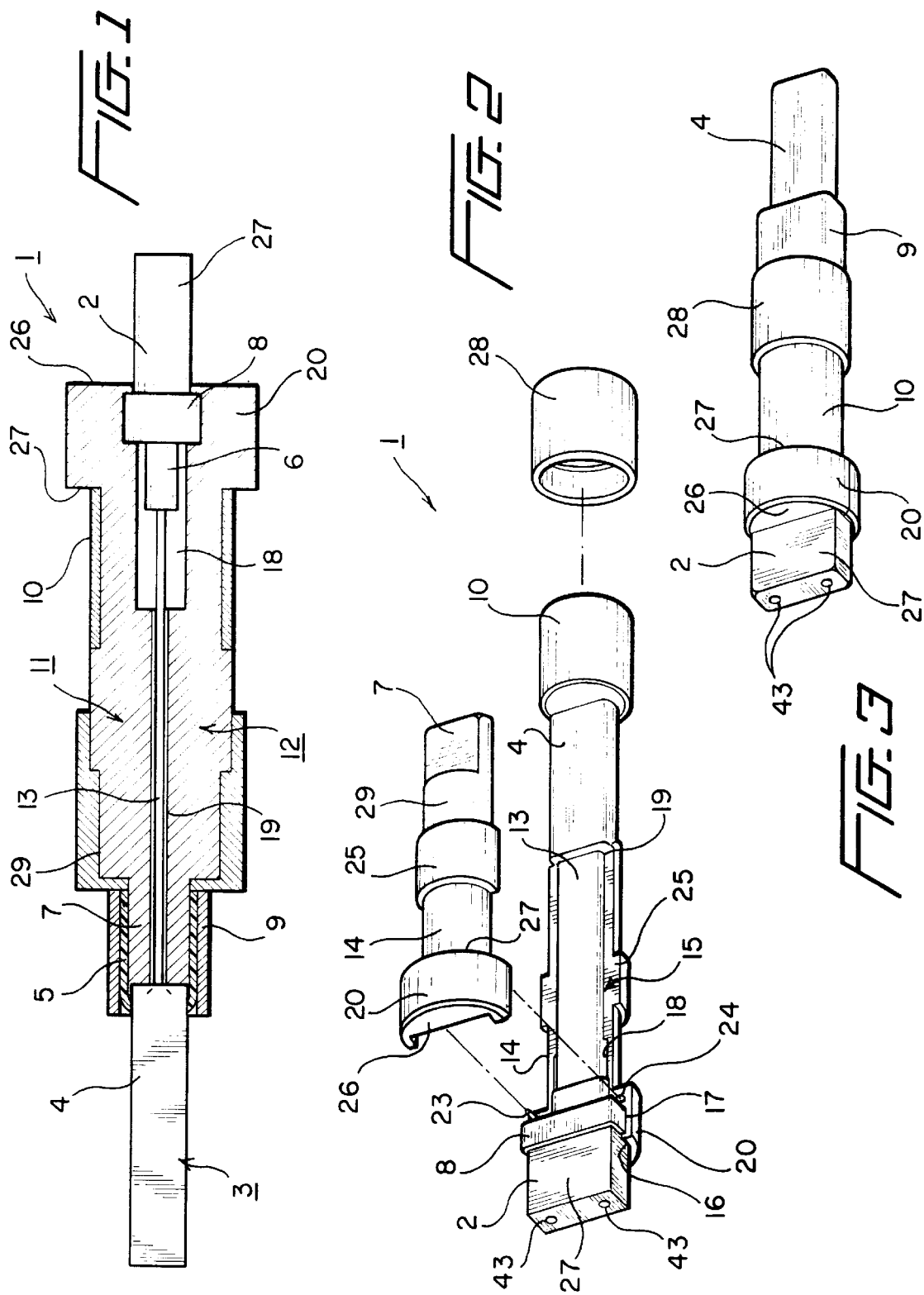

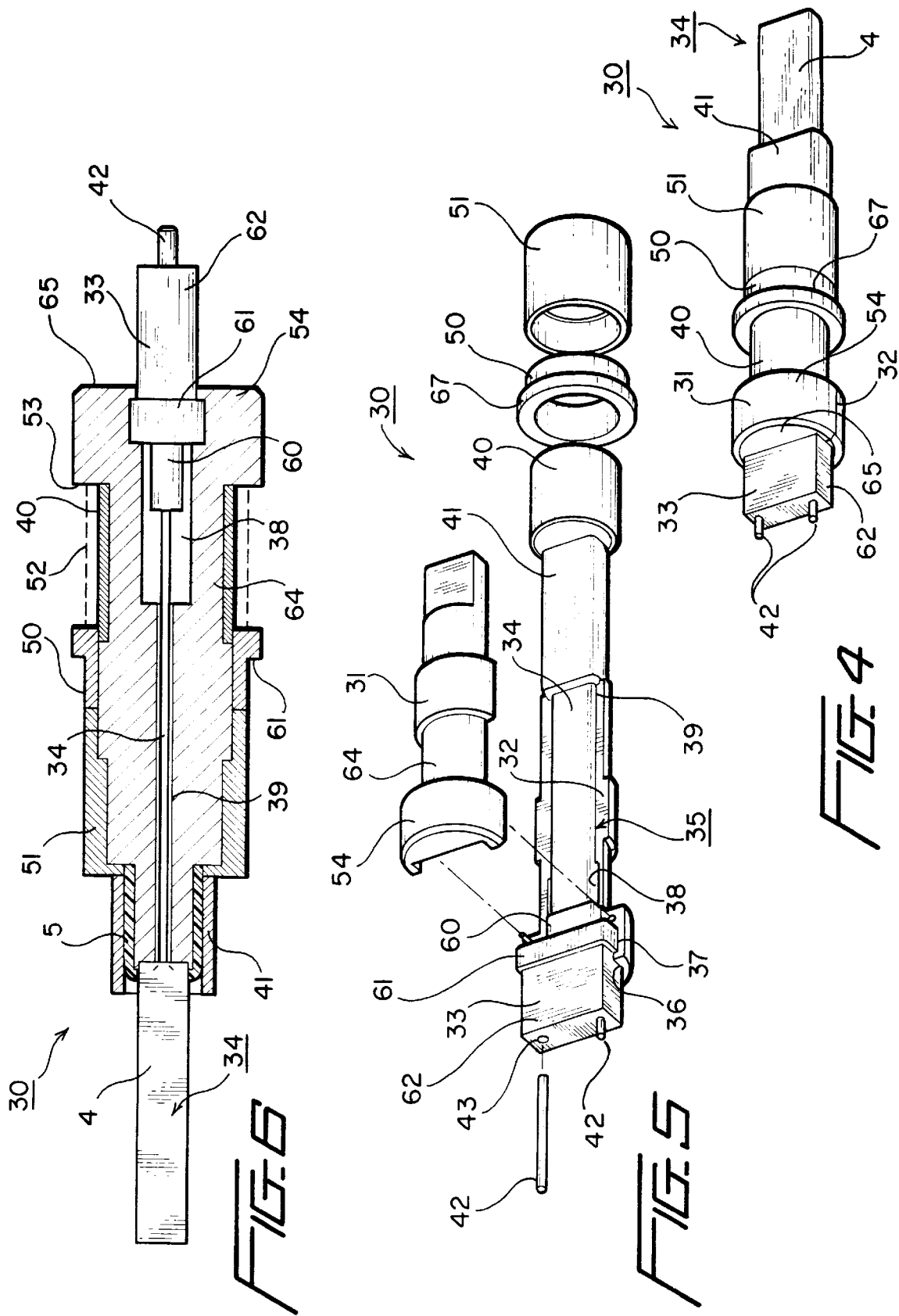

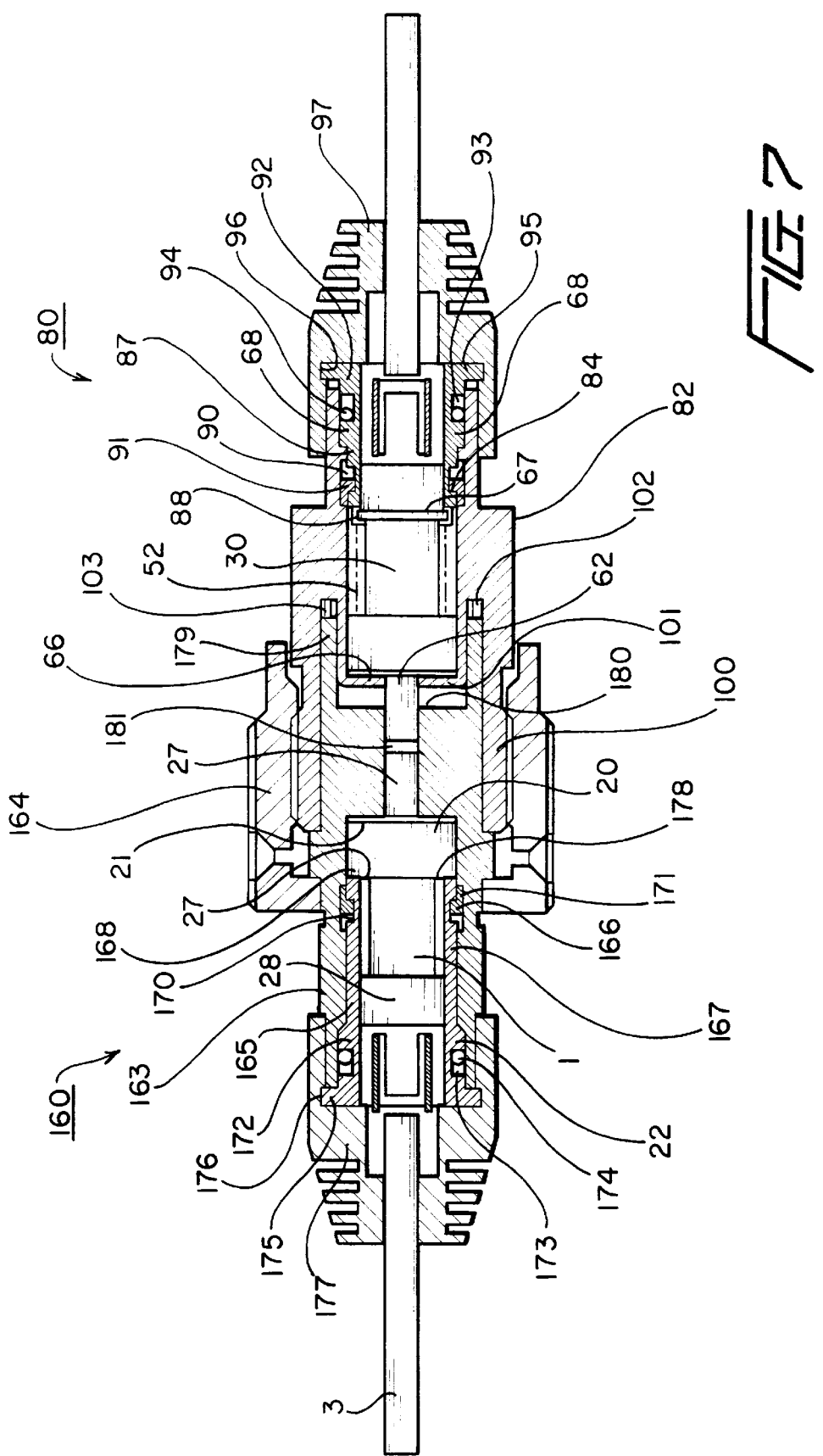

ARRANGEMENT FOR INTEGRATING A RECTANGULAR FIBER OPTIC CONNECTOR INTO A CYLINDRICAL CONNECTOR

BACKGROUND OF THE INVENTION

1. Field of the Invention

This invention relates to a fiber optic coupling arrangement, and in particular to an arrangement for integrating parallelepiped-shaped (hereinafter referred to as "rectangular") fiber optic connectors or ferrules into a mating pair of cylindrical connectors having environmental sealing, anti-vibration, and coupling features in common with cylindrical electrical connectors.

2. Description of Related Art

Copending U.S. patent application Ser. No. 09/149,568, filed Sep. 9, 1998, discloses an arrangement for integrating rectangular fiber optic connectors or ferrules into a standard cylindrical multiple contact connector system of the type heretofore normally used to house electrical contacts. In order to facilitate integration of the rectangular fiber optic connectors or ferrules into the standard cylindrical multiple contact connector system, the fiber optic connectors or ferrules are captured between halves of respective cylindrical contact housings. The cylindrical contact housings are configured such that they can take the place of the electrical contacts in the standard cylindrical multiple contact connector, permitting the same basic connector design to be used for both electrical and fiber optic connections.

The present invention also utilizes cylindrical fiber optic contact housings of the type disclosed in U.S. patent application Ser. No. 09/149,568, but applies them to a more robust connector arrangement having enhanced environmental and shock or vibration protection features that permit the connector to be used under adverse conditions, such as in military or aerospace applications. In particular, whereas the connector described in the copending application utilizes a standard connector shell and inserts, the present invention modifies the shell and inserts in order to provide enhanced alignment functions for the fiber optic ferrules or connectors, and to better accommodate environmental sealing and shock or vibration resistance features, without sacrificing the advantages of simplicity and ease-of-use offered by the connectors described in the copending application.

As in the copending application, the present invention is suitable for use with the rectangular fiber optic connector structure known as the "Mechanical Transfer" (MT) connector or ferrule, which is essentially a housing that encapsulates the ends of a plurality of fibers and thus aids in aligning the fibers so that the ends of the fibers can be mechanically joined together to establish a connection between the respective groups of fibers housed or encapsulated by the mating ferrules.

In general, in order to establish a connection between two groups of optical fibers, most fiber optic connector systems require, in addition to a ferrule structure for holding the fibers, some sort of external shell and/or coupling arrangement that aligns the MT connectors and allows them to be joined together. While some of the known coupling arrangements are widely used, however, the known fiber optic coupling arrangements are either difficult to use, relatively complex, or lack robustness in comparison with electrical connectors. Such a trade-off between ease-of-use, complexity, and robustness has heretofore been assumed to be essentially inherent in fiber optic connector designs because of the precise alignment required of fiber optic connections, resulting in a tolerance for cost and complexity among fiber optic users that would not be acceptable in the case of electrical connectors.

In the case of MT and other rectangular fiber optic connector systems, the rectangular shape of conventional coupler designs, which follows from the shape of the ferrule, compounds the above-noted disadvantages of fiber optic connectors in general by making environmental sealing difficult, and precluding use of simply coupling nut arrangements which simply require threading of a coupling nut on one connector onto the mating connector.

One such conventional connector system, the MTP fiber optic connection system, requires both mating pairs of MT connectors, which are housed within two identical spring loaded connector sections, and a separate coupling device into which the spring-loaded sections must be inserted. The need for a separate coupling device increases the time required to establish a connection and makes it difficult to include environmental protection or vibration resistance features and, moreover, once the two rectangular coupling members are joined together via the third coupling device, there is no way to decouple the MT connectors in order to replace or repair them.

On the other hand, the alternative MT ferrule connector system described in U.S. Pat. No. 5,619,604 eliminates the need for a separate coupling device, but requires that the MT connectors be housed in relatively complex and fragile five-piece shells, including both a guide pin and aperture arrangement and also a guide prong and tongue arrangement, to provide necessary alignment between mating ferrules.

Thus, present fiber optic coupling arrangements that employ rectangular fiber optic connectors are either inconvenient in that they require a separate coupling member, or are relatively complex. In addition, most such coupling arrangements are not suitable for use in non-office environments, lacking sealing and shock or vibration protection features that would only add to their complexity or make them less convenient to use.

The present invention, in contrast, provides a connector system for MT and other rectangular or parallelepiped-shaped connectors with complete environmental sealing and shock or vibration protection, and that can be coupled in a simple manner under adverse conditions. Essentially, the present invention seeks to apply principles which have been learned over the course of many years through experience with electrical connectors, as represented in part by the current military specifications, in order to place fiber optic connectors on a par with electrical connectors in terms of ease-of-use and robustness, and thereby eliminate the dichotomy between electrical and fiber optic connectors that has existed since fiber optic connectors first began to be commercialized. Furthermore, by merging fiber optic and electrical connector designs, the present invention has the additional advantage of enabling use of standard parts such as o-rings and gaskets, as well as standard assembly and installation procedures.

In addition to the above-mentioned MTP system and the arrangement disclosed in U.S. Pat. No. 5,619,604, background for the present invention includes various proposed arrangements involving integration of rectangular fiber optic connectors into specially designed cylindrical connector housings arranged to collectively accommodate multiple rectangular fiber optic connectors, rather than to accommodate individual cylindrical contact shells in which are captured the fiber optic connectors, and which therefore lack the advantages of simplicity and standardization provided by the present invention. Examples of such arrangements are described in U.S. Pat. Nos. 4,142,776 and 5,689,598. Other references showing cylindrical fiber optic coupler configurations, but which do not utilize rectangular MT connectors or ferrules, include U.S. Pat. Nos. 5,715,342, 5,283,848, 5,000,536, 4,174,882, and 4,140,367.

Because it is impossible to describe in detail every possible connector configuration in which the present invention could be used, the detailed description of the preferred embodiment presented below is particularly directed to the size 9 cylindrical connector referred to in U.S. Department of Defense specifications as the MIL-C-38999 Series III connector. This connector is particularly advantageous from the standpoints of robustness, ease-of-use, installation, and servicing under difficult conditions. It should nevertheless be appreciated that the goals of robustness and ease-of-use, installation, and servicing are also relevant to civilian applications such as avionics, and even to coupling arrangements intended for use in office environments, and that since none of the above-cited references discloses integration of a rectangular fiber optic connector, such as an MT connector or ferrule, into a standard cylindrical connector housing of the type conventionally used to establish electrical connections, those skilled in the art should appreciate that the invention is intended to generally cover any arrangement for integrating rectangular fiber optic connectors into cylindrical connectors by enclosing individual rectangular fiber optic connectors in cylindrical contact housings for insertion into cylindrical connectors, and is not to be limited to "Mil Spec" connectors, or to any particular cylindrical connector configuration.

SUMMARY OF THE INVENTION

It is accordingly a first objective of the invention to provide a relatively low cost, high performance fiber optic connector system suitable for use in a wide variety of applications, utilizing standardized parts including standard fiber optic ribbon cable connectors or ferrules, and adapting them to a cylindrical configuration.

It is a second objective of the invention to provide a two-piece MT connector coupling system having a relatively simple design, and yet which can be adapted to include environmental sealing and other features such as shock or vibration protection, that make the system suitable for use under a variety of adverse conditions.

It is a third objective of the invention to provide an MT connector coupling system that enables the MT connectors to be easily coupled and decoupled.

It is a fourth objective of the invention to provide a simplified mounting arrangement for an MT connector, and in particular to provide an arrangement for adapting an MT connector to a MIL-C-38999 or similar connector configuration.

These objectives are achieved, in accordance with the principles of a preferred embodiment of the invention, by providing a mating receptacle and plug connector system in which a fiber optic contact assembly of the type disclosed in copending U.S. patent application Ser. No. 09/149,568, i.e., a contact assembly that includes a pair of contact halves arranged to capture a rectangular fiber optic connector and form a cylindrical contact, is inserted into a cylindrical connector shell, the cylindrical connector shell being arranged to provide alignment functions for mating fiber optic connectors, a simplified coupling arrangement of the type commonly used in electrical connectors, and environmental sealing and anti-vibration features similar to those utilized in the current design of the MIL-C-38999 family of connectors.

In an especially preferred embodiment of the invention, the shell of the receptacle connector has an exterior configuration compatible with the current MIL-C-38999 connector design, but is modified to include an alignment structure, and in particular a groove or guide track structure, adapted to align the mating connector ferrules during coupling, the mating connector ferrules being captured in a contact housing of the above-mentioned type, inserted into a cylindrical passage in the shell, and held in place by a rear insert that also accommodates the sealing features.

The combination of the cylindrical contact housing of the above-cited copending application with a cylindrical connector shell having a standard exterior configuration and an interior modified to receive the cylindrical contact housing (while at the same time positioning mating portions of the fiber optic connector situated in the cylindrical contact housing and a corresponding mating fiber optic connector), enables use of standard environmental sealing features such as a cable rear seal, o-ring seal, and main joint gasket, and a coupling nut that includes anti-decoupling features, while ensuring proper alignment of the optical fibers during mating and also accommodating the axial biasing arrangement necessary in all fiber optic connectors to ensure that mating faces of the ferrules that house the fibers engage each other to prevent optical losses at the interface.

BRIEF DESCRIPTION OF THE DRAWINGS

FIG. 1 is an isometric view of an assembled pin contact constructed in accordance with the principles of a preferred embodiment of the invention.

FIG. 2 is an isometric view showing the various parts of the fiber optic pin contact illustrated in FIG. 1.

FIG. 3 is a cross-sectional side view of the assembled pin contact illustrated in FIG. 2.

FIG. 4 is an isometric view of an assembled fiber optic socket contact constructed in accordance with the principles of the preferred embodiment of the invention.

FIG. 5 is exploded isometric view showing the various parts of a fiber optic socket contact corresponding to the pin contact illustrated in FIG. 4.

FIG. 6 is a cross-sectional side view of the assembled socket contact of FIG. 5.

FIG. 7 is a cross-sectional side view of a mated plug and receptacle connector system constructed in accordance with the principles of the preferred embodiment of the invention.

DETAILED DESCRIPTION OF THE PREFERRED EMBODIMENTS

Figure 9:
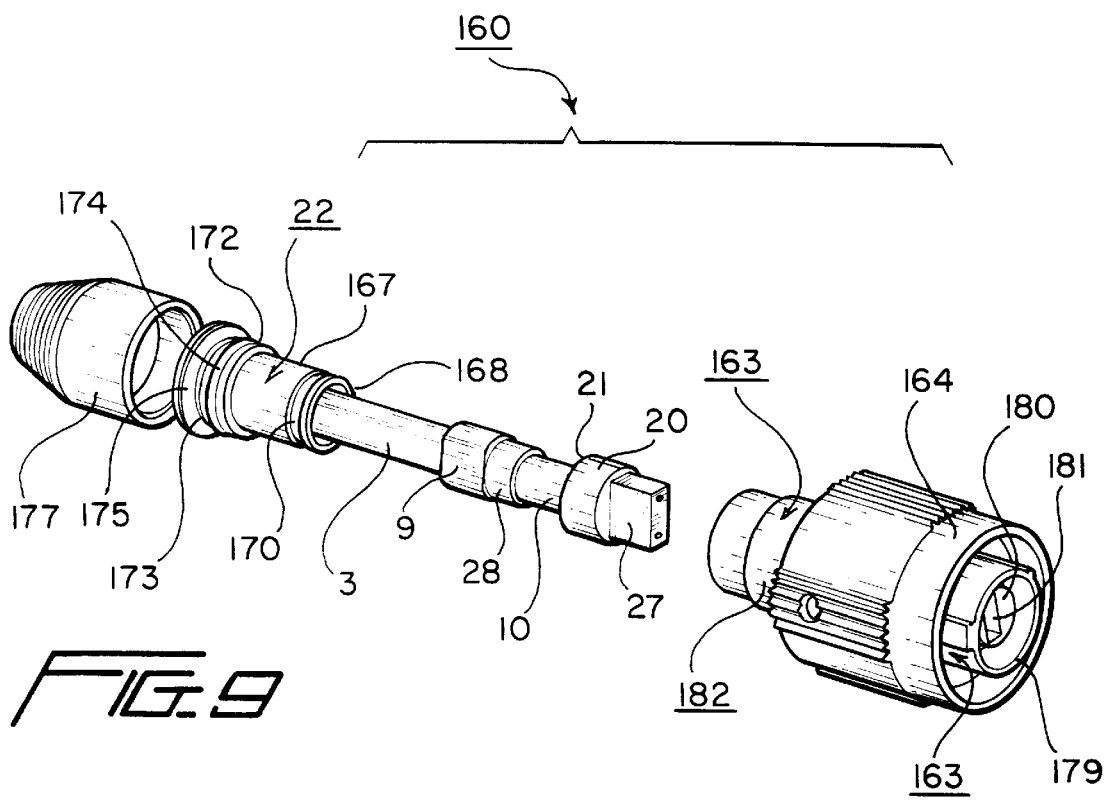
FIG. 9 is an isometric view showing various components of the plug connector shown in FIGS. 7 and 8.

FIGS. 1–6 illustrate respective fiber optic pin and socket contacts similar to those disclosed in copending U.S. patent application Ser. No. 09/149,568, for use in the connector system illustrated in FIGS. 7–11. The principal difference between the contacts illustrated in FIGS. 1–6 and the contacts described in the copending application is that the pin and socket contacts illustrated herein have essentially the same exterior configuration, corresponding to the configuration shown in FIGS. 4–6 of the copending application, rather than different configurations, with the pin contact differing from the socket contact only in the lack of a bias mechanism, thus allowing the same contact housings to be used for both the socket and pin contacts.

The pin contact 1 illustrated in FIGS. 1–3 is arranged to capture a fiber optic ferrule 2 and a ribbon cable 3 that has been terminated to the ferrule 2, and that includes multiple optical fibers (not shown) enclosed within a jacket 4, the jacket conventionally surrounding both the fibers and a strength member (a section 5 of which is shown in FIG. 3). In the preferred embodiment, the strength member and jacket are stripped back from the ferrule 2 to a specific dimension, the jacket 4 being stripped to a further specific dimension, leaving exposed the above-mentioned section 5 of the strength member, which is slit so that it can be fitted over a crimp ferrule 7 at the rear of the assembled contact body, as will be described below.

Ferrule 2 is illustrated as an MT connector of the type having a pin block 8 and strain relief 6 extending from the rear of the ferrule. The ferrule and ribbon cable are both standard and form no part of the present invention, although those skilled in the art will appreciate that the invention is in principle applicable to any parallelepiped-shaped or "rectangular" fiber optic connector, connector block, or ferrule arranged to provide a reference for aligning the ends of one or more optical fibers so that they can be coupled to other optical fibers housing in similar connectors, connector blocks, or ferrules.

In addition to ferrule 2 to which ribbon cable 3 has been pre-terminated, fiber optic pin contact 1 includes a crimp sleeve 9, a member 10 for securing halves of the pin contact together, and pin contact halves 11 and 12. The exterior configuration of pin contacts halves 11 and 12 is such that, when the pin contact halves are assembled together with the ferrule 2 and ribbon cable 3 captured therebetween, the resulting pin contact can be fitted into cylindrical passages in the connector shell, as will be described in more detail below, with retention of the contact in the shell being provided by capturing a collar 20 having respective surfaces 26 and 27 between a shoulder 21 provided in the connector shell and a contact retention insert 22, as described in detail below in connection with FIG. 7.

As is evident from FIG. 2, each of the pin contact halves includes a passage 15 made up of a section 16 through which the mating portion of the ferrule extends, an enlarged section 17 dimensioned so as to capture pin block 8 of the fiber optic ferrule 2, a further section 18 extending rearwardly of section 17 for accommodating strain relief 6, and a still further section 19 extending rearwardly from the groove 18 for accommodating the stripped portion 13 of the fiber optic ribbon cable. Each of the pin contact halves also includes a pin 23 and an opening 24 for facilitating alignment of the halves upon assembly to each other with the ferrule 2 and ribbon cable 3 captured therebetween.

Passage 15 is arranged such that when ferrule 2 is seated in section 16, a portion 27 of ferrule 2 extends forwardly out of the contact. Although the MT ferrule of the preferred embodiment already includes alignment structures in the form of openings 43 and/or pins 42 (shown in FIG. 5), the invention as will be described below provides additional guidance features in the form of guide tracks in the connector shell so as to further improve alignment, facilitate mating and prevent misregistration of pins 42 and openings 43 which could cause damage.

The exterior of the illustrated pin contact features a cylindrical intermediate surface 14, a raised portion 25 extending from the surface 14 to a shoulder for positioning a rear sleeve member 28, and a surface 29 over which the sleeve member 28 is situated. Sleeve member 28 serves to further secure mating of the contacts halves, but its primary function is to limit movement of a spring bias mechanism. Since in the illustrated embodiment, the bias mechanism is included only in the socket contact of FIGS. 4–6, sleeve member 28 may be omitted. On the other hand, for some purposes it may be desired to include a spring bias on the pin contact only, or on both the pin and socket contacts, and therefore the sleeve can be included even when a bias mechanism is not included so that the exterior form of the pin and socket contacts will be the same.

To assemble the pin contact shown in FIGS. 1–3, ferrule 2 and a portion 13 of the cable that has been stripped of both the jacket and strength member are positioned in one of the contact halves 11,12 and the contact halves are joined together. The securing member 10, which has been slid over the ribbon cable before assembly of the contact halves to each other, is then fitted over a cylindrical intermediate portion 14 of the assembled contact halves. In the illustrated embodiment, securing member 10 is a heat shrink sleeve which is heated to secure the contact halves together, but those skilled in the art will appreciate that the contact halves may be held together by any known mechanical, adhesive, or other securing means. The pin contact assembly 1 is completed by positioning sleeve 28, if included, and crimp sleeve 9 over the crimp ferrule 7, and crimping crimp sleeve 9 and the exposed section 5 of the strength member to crimp ferrule 7. If a bias mechanism is to be included, then the bias spring and sliding bias collar, described in connection with FIGS. 4–6, must be fitted over the contact before the sleeve 28 and crimp sleeve 9.

Turning to FIGS. 4–6, socket contact 30 is similar to pin contact 1 in that it includes contact halves 31 and 32 arranged to capture a fiber optic ferrule 33 and ribbon cable 34 within a passage 35 made up of sections 36–39. Also, as in the pin contact illustrated in FIGS. 1–3, the socket contact halves 31 and 32 may be held together by a contact retention collar 40 and a crimp sleeve 41, which are respectively slid over the ribbon cable before assembly of the contact halves to each other, and the outside configuration of the socket contact is such that the socket contact can be fitted into a cylindrical multiple contact v connector shell or housing using a standard insert arrangement. Ribbon cable 34 and ferrule 33, including strain relief 60, pin block 61, and forward mating section 62 are, in the illustrated embodiment, identical to ferrule ribbon cable 3 and ferrule 2 shown in FIGS. 1–3, although ferrule 33 is illustrated as including alignment pins 42 inserted into openings 43.

In addition to the above elements, socket contact 30 includes a rear collar 50 and a retention sleeve 51 that are fitted over respective intermediate portions of the assembled socket contact. Retention collar 50 is biased in a rearward direction against the rear sleeve 51, which corresponds to sleeve 28 illustrated in FIGS. 1–3, by a coil spring 52 surrounding an intermediate portion 64 of the assembled contact halves so that it abuts a shoulder 53 at the rear of the front collar portion 54 of the assembled contact. This allows the mating interface of ferrule 33 to be biased against the corresponding mating interface of ferrule 2 in order to ensure a good coupling between the optical fibers in the respective connectors upon mating. Those skilled in the art will recognize that such biasing arrangements are well known in the art (though not in the context of a cylindrical contact housing for a rectangular MT connector, and that other suitable biasing arrangements may be substituted for the illustrated one.

Unlike the corresponding collar 20 of the pin contact shown in FIGS. 1–3, front collar portion 54 of the socket contact is not captured by an insert. Instead, front surface 65 of portion 54 will normally only engage a corresponding surface 66 of the shell prior to mating, the contact instead being captured by engagement between a rear surface 67 on an extension of bias collar 50 and a corresponding front surface 88 of an insert 68. Upon mating of corresponding connectors, engagement between the respective forward portions 27 and 62 of mating ferrules 2 and 33 will cause the socket contact to move against the bias provided by spring 52 in a rearward direction relative to the collar 50, which is prevented from moving by the insert 68.

The connector system in which the pin and socket contacts illustrated in FIGS. 1–6 are utilized, as illustrated in FIGS. 7–11, corresponds generally to a size MIL-C-38999 series III connector, and includes a plug 160 and receptacle 80. FIG. 7 illustrates plug 160 and receptacle 80 in cross-section following mating, while FIGS. 8 and 9 separately illustrate plug 160 and FIGS. 10 and 11 separately illustrate receptacle 80.

Figure 8:
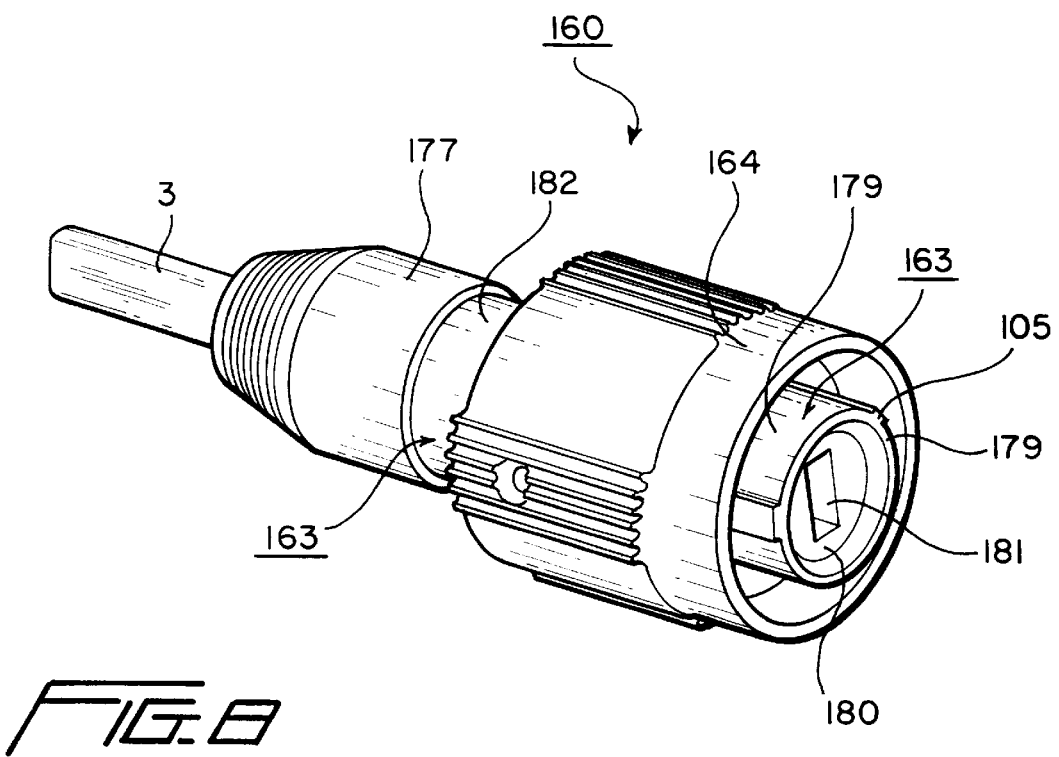
FIG. 8 is an isometric view of the plug connector shown in FIG. 7.
Figure 11:
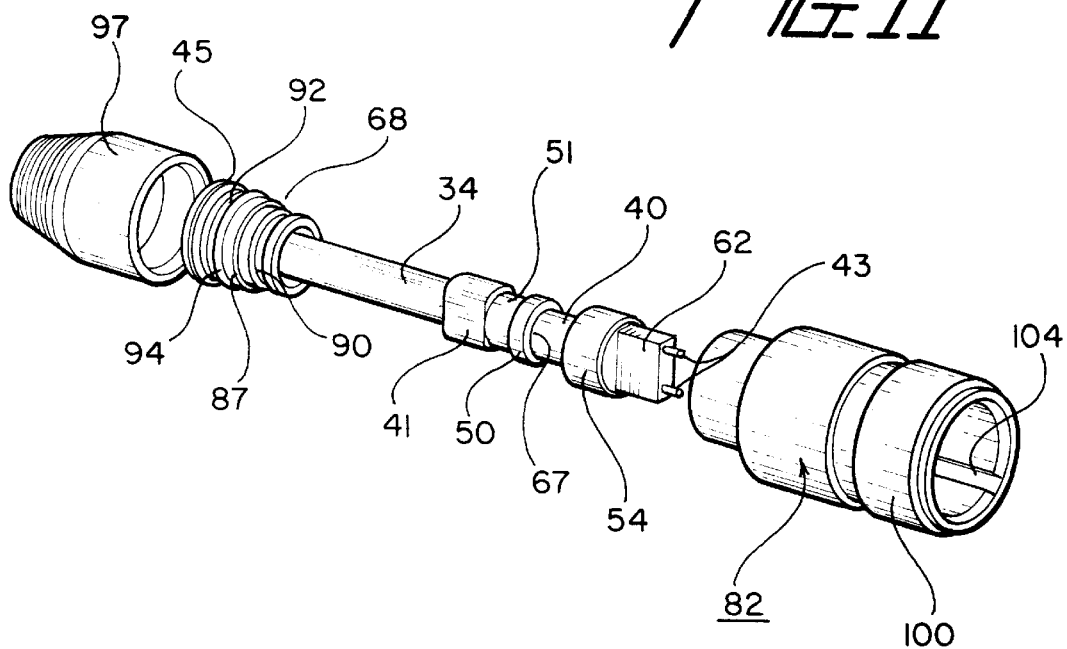
FIG. 11 is an isometric view showing various components of the receptacle connector of FIG. 10.
Figure 10:
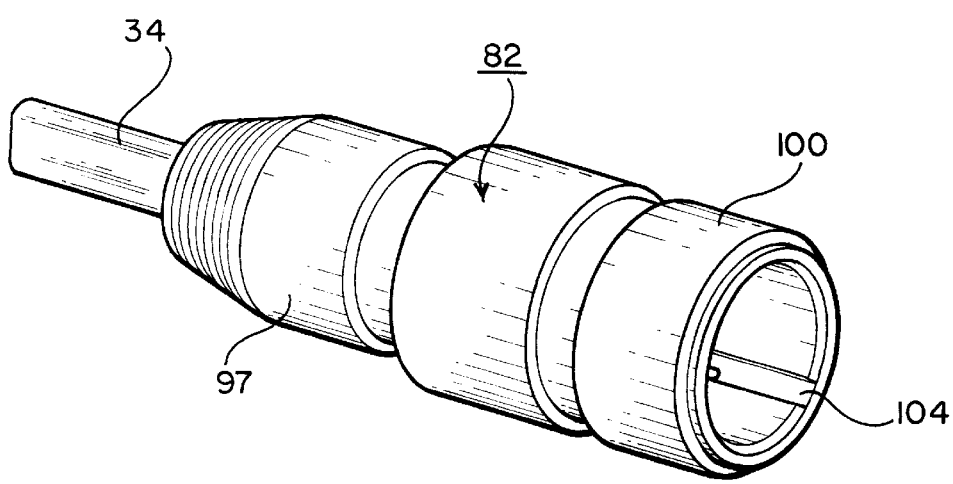
FIG. 10 is an isometric view of the receptacle connector shown in FIG. 7.

As shown in FIGS. 7–9, plug 160 includes a cylindrical plug body or shell 163 on which is mounted a coupling nut 164, and in which is positioned a retention insert 165 for receiving and retaining a plug contact 1 of the type described above in connection with FIGS. 1–3. In particular, contact 1 is arranged to be held within the plug body 163 by retention insert 22, the retention insert including a cylindrical front portion 167 having a front surface 168 arranged to engage the rear surface 169 of collar 20 in order to capture collar 20 against shoulder 21 in the connector shell.

Retention insert 20 includes an undercut 170 arranged to receive tines 171 of a retention clip 166, a rear portion 172 having an undercut 173 arranged to receive an o-ring 174, and a flange 175 arranged to fit within a groove 176 of rear sealing grommet 177, thus providing an effective environmental seal for the fiber connection that corresponds, both with respect to simplicity and effectiveness, to environmental seals currently used in cylindrical electrical connectors of the above-discussed type.

Cylindrical plug body 163 has a rear chamber 182 shaped to accommodating and position insert 22 and contact shell 1, including an undercut 178 for receiving the retention clip 166, and a front mating portion 179 having a recessed front surface 180 into which extends an inner passage, groove, slot, guide track, or the like 180 for receiving and relatively aligning front portion 27 of ferrule 2 and front portion 2 of ferrule 33, thus facilitating mating of the ferrules and ensuring proper registration during and after mating.

Because the exterior of shell 163 has a conventional configuration, it can be arranged to include a standard coupling nut 164 having anti-decoupling features, such as tri-start threads and an anti-vibration spring (not shown) for preventing the nut from turning due to shocks or vibrations.

Receptacle 80 includes a cylindrical receptacle body 82 arranged to hold socket contact 30 and contact retention insert 68, which is held in place by clip 84, the retention insert including a cylindrical front portion 87 having a front surface 88 arranged to engage the rear surface 67 of movable collar 50 on pin contact 30, and which includes a groove 90 arranged to receive tines 91 of the retention clip 86, a rear portion 92 having a groove 93 arranged to receive an o-ring 94, and a flange 95 arranged to fit within a groove 96 of rear sealing grommet 97. It will be appreciated that even though the respective plug and receptacle inserts 22 and 68 differ in the manner in which the respective pin and socket contacts 1 and 30 are captured, due to the inclusion of a spring bias on only one of the contacts, the use of inserts of the type described allows the same environmental sealing arrangements to be used on both connector halves.

Unlike the plug body, however, receptacle body 82 does not perform any ferule guiding or alignment functions. Instead, receptacle body 82 includes a cylindrical externally threaded front section 100 arranged to receive the corresponding front section 179 of the plug body, the front section including a recessed mating surface 101 and annular slot 102 for receiving the forwardmost portion of section 179 as well as a main sealing gasket 103, which may be identical to the type of main sealing gasket used in corresponding electrical connectors. Finally, front section 100 of main body 82 may include a guide slot 104 for receiving a corresponding projection 105 on the receptacle main body, thereby ensuring a proper rotational orientation of the connectors during mating.

The connector assembly procedure for the connectors of the above-described embodiments is as follows:

In order to install the contact halves to the MT connectors, the cable rear seal, crimp sleeve, and retention insert for the plug and receptacle connectors, and the contact spring for the receptacle connector, as well as the optional heat shrink sleeve, are installed on the fiber optic ribbon cable, after which the MT connector is terminated to the fiber optic ribbon cable, the protective outer jacket of the cable is stripped back to a specific dimension and the jacket is slit a further specific dimension beyond so that there are two segments of the protective jacket, including strength members, one above the ribbon and one below.

On the receptacle connector only, the MT alignment pins are then carefully positioned into the MT connector. The two halves of the MT fiber optic contact housing are brought together to capture the MT connector and the fiber optic ribbon cable and MT alignment pins on the receptacle connector only. The split portions of the protective jacket are spread apart to straddle the assembled contact housing halves, and the halves are either bonded together or held together with the heatshrink sleeve.

The spring, in the receptacle connector only, is slid into position on the contact housings, the crimp sleeve is brought into position at the rear of the assembled contact housing, over the slit jacket and strength member portions of the protective jacket on the fiber optic cable, and the crimp sleeve is crimped, securing the slit portions of the protective jacket to the contact housings. The retention insert is then slid up onto the assembled contact housings, and the contact housing are slid into the body until the retention clip snaps into the undercut on the retention insert, locking it into the respective plug or receptacle body.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

We claim:

1. A cylindrical fiber optic connector system including a cylindrical connector body and a cylindrical fiber optic contact in which is captured a rectangular fiber optic ferrule, wherein said cylindrical fiber optic contact is retained in said cylindrical connector body by a cylindrical retention insert, wherein at least one sealing member is situated between said retention insert and said cylindrical connector body, said cylindrical fiber optic contact includes a collar at a front section and said contact is held in said cylindrical connector body by engagement of a front surface of said collar with a shoulder of said connector body, and by engagement of a rear surface of said collar with a front surface of said cylindrical retention insert.

2. A cylindrical connector system as claimed in claim 1, further comprising a coupling nut mounted on said cylindrical connector body.

3. A cylindrical connector system as claimed in claim 2, wherein said coupling nut includes anti-vibration features.

4. A cylindrical connector system as claimed in claim 1, wherein said at least one sealing member includes an o-ring positioned between said cylindrical retention insert and said cylindrical connector body, and a rear sealing gasket.

5. A cylindrical connector system as claimed in claim 1, wherein the rear sealing gasket includes an annular groove arranged to fit over a flange on the cylindrical retention insert.

6. A cylindrical connector system as claimed in claim 1, wherein said cylindrical retention insert is retained within said cylindrical connector body by a clip seated in undercuts on the insert and in the connector body.

7. A cylindrical connector system as claimed in claim 1, wherein said cylindrical connector body is further arranged to include a passage for receiving mating portions of said ferrule and a mating ferrule housed in a connector to which the cylindrical connector body is to be mated, said passage serving to align said mating portions of said ferrules.

8. A cylindrical connector system as claimed in claim 1, wherein said fiber optic contact includes two contact housing members arranged to capture therebetween said ferrule and a portion of a fiber optic cable including said fiber and extending from said ferrule.

9. A connector system as claimed in claim 8, further includes a sleeve member arranged to secure said two contact housing members to each other.

10. A connector system as claimed in claim 1, wherein said cylindrical fiber optic contact includes a first collar, a second collar and, situated between the first and second collars, a spring and a movable collar, said retention insert engaging said movable collar to retain said cylindrical fiber optic contact in said cylindrical connector body while permitting axial movement of the cylindrical fiber optic contact relative to the connector body, said spring biasing said cylindrical fiber optic contact in a forward direction.

11. A connector system as claimed in claim 1, wherein said cable is a fiber optic ribbon cable.

12. A connector system as claimed in claim 1, wherein said fiber optic ferrule is an MT ferrule.

13. A cylindrical fiber optic connector system including a cylindrical connector body and a cylindrical fiber optic contact in which is captured a first rectangular fiber optic connector, wherein said cylindrical fiber optic contact is retained in said cylindrical connector body by a cylindrical retention insert the cylindrical connector body includes a first passage in which said cylindrical fiber optic contact is received and positioned, and a second passage in communication with said first passage for receiving a mating portion of the first rectangular fiber optic connector, said second passage further being arranged to receive a mating portion of a second fiber optic connector situated in a mating connector, the second passage thereby aligning the first and second fiber optic connectors and wherein said cylindrical fiber optic contact includes a collar at a front section and said contact is held in said cylindrical connector body by engagement of a front surface of said collar with a shoulder of said connector body, and by engagement of a rear surface of said collar with a front surface of said cylindrical retention insert.

14. A cylindrical connector system as claimed in claim 13, further comprising a coupling nut mounted on said cylindrical connector body.

15. A cylindrical connector system as claimed in claim 14, wherein said coupling nut includes anti-vibration features.

16. A cylindrical connector system as claimed in claim 13, wherein said at least one sealing member includes an o-ring positioned between said cylindrical retention insert and said cylindrical connector body, and a rear sealing gasket.

17. A cylindrical connector system as claimed in claim 13, wherein the rear sealing gasket includes an annular groove arranged to fit over a flange on the cylindrical retention insert.

18. A cylindrical connector system as claimed in claim 13, wherein said cylindrical retention insert is retained within said cylindrical connector body by a clip seated in undercuts on the insert and in the connector body.

19. A cylindrical connector system as claimed in claim 13, wherein said fiber optic contact includes two contact housing members arranged to capture therebetween said ferrule and a portion of a fiber optic cable including said fiber and extending from said ferrule.

20. A connector system as claimed in claim 19, further includes a sleeve member arranged to secure said two contact housing members to each other.

21. A connector system as claimed in claim 13, wherein said cylindrical fiber optic contact includes a first collar, a second collar and, situated between the first and second collars, a spring and a movable collar, said retention insert engaging said movable collar to retain said cylindrical fiber optic contact in said cylindrical connector body while permitting axial movement of the cylindrical fiber optic contact relative to the connector body, said spring biasing said cylindrical fiber optic contact in a forward direction.

22. A connector system as claimed in claim 13, wherein said cable is a fiber optic ribbon cable.

23. A connector system as claimed in claim 13, wherein said fiber optic ferrule is an MT ferrule.

24. A cylindrical fiber optic connector system including a cylindrical connector body, a cylindrical fiber optic contact in which is captured a rectangular fiber optic ferrule, wherein said cylindrical fiber optic contact is retained in said cylindrical connector body by a cylindrical retention insert, and wherein at least one sealing member is situated between said retention insert and said cylindrical connector body and wherein said cylindrical fiber optic contact includes a first collar, a second collar and, situated between the first and second collars, a spring and a movable collar, said retention insert engaging said movable collar to retain said cylindrical fiber optic contact in said cylindrical connector body while permitting axial movement of the cylindrical fiber optic contact relative to the connector body, said spring biasing said cylindrical fiber optic contact in a forward direction.

25. A cylindrical fiber optic connector system including a cylindrical connector body and a cylindrical fiber optic contact in which is captured a first rectangular fiber optic connector, wherein the cylindrical fiber optic contact is retained in said cylindrical connector body by a cylindrical retention insert and the cylindrical connector body includes a first passage in which said cylindrical fiber optic contact is received and positioned, and a second passage in communication with said first passage for receiving a mating portion of the first rectangular fiber optic connector, said second passage further being arranged to receive a mating portion of a second fiber optic connector situated in a mating connector, the second passage thereby aligning the first and second fiber optic connectors and wherein said cylindrical fiber optic contact includes a collar at a front section, and wherein said cylindrical fiber optic contact includes a first collar, a second collar and, situated between the first and second collars, a spring and a movable collar, said retention insert engaging said movable collar to retain said cylindrical fiber optic contact in said cylindrical connector body while permitting axial movement of the cylindrical fiber optic contact relative to the connector body, said spring biasing said cylindrical fiber optic contact in a forward direction.

\* \* \* \* \*

UNITED STATES PATENT AND TRADEMARK OFFICE
CERTIFICATE OF CORRECTION

PATENT NO. : 6,206,579 B1  
DATED : March 27, 2001  
INVENTOR(S) : Selfridge et al.

Page 1 of 1

It is certified that error appears in the above-identified patent and that said Letters Patent is hereby corrected as shown below:

<u>Column 6,</u>  
Line 49, after "contact" delete -- v --.

<u>Column 7,</u>  
Line 22, before "MIL" insert -- 9 --.

Signed and Sealed this

Ninth Day of April, 2002

Attest:

JAMES E. ROGAN  
*Attesting Officer*  *Director of the United States Patent and Trademark Office*